US012205320B1

(12) United States Patent
Somavar Muniappan et al.

(10) Patent No.: US 12,205,320 B1
(45) Date of Patent: Jan. 21, 2025

(54) SYSTEMS AND METHODS FOR CALIBRATING A SHUTTLE TRACK

(71) Applicant: Amazon Technologies, Inc., Seattle, WA (US)

(72) Inventors: Vinodhkumar Somavar Muniappan, Redmond, WA (US); Michael Alan Bray, Elkhorn, NE (US); Divya Natarajan, Mt Juliet, TN (US); Gurjinder Singh Dhami, Auburn, WA (US); Ganesh Krishnamoorthy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/344,539

(22) Filed: Jun. 29, 2023

(51) Int. Cl.
*G06T 7/73* (2017.01)

(52) U.S. Cl.
CPC ...... *G06T 7/73* (2017.01); *G06T 2207/10028* (2013.01); *G06T 2207/20081* (2013.01); *G06T 2207/30108* (2013.01); *G06T 2207/30252* (2013.01)

(58) Field of Classification Search
CPC ............. G06T 7/73; G06T 2207/10028; G06T 2207/20081; G06T 2207/30108; G06T 2207/30252

USPC .......................... 348/143; 382/103, 141, 152
See application file for complete search history.

(56) References Cited

U.S. PATENT DOCUMENTS

| 11,945,665 B1* | 4/2024 | Lais ....................... B65G 54/02 |
| 2017/0344009 A1* | 11/2017 | Wernersbach ........... H04B 7/04 |

* cited by examiner

*Primary Examiner* — Sherrie Hsia
(74) *Attorney, Agent, or Firm* — Eversheds Sutherland (US) LLP (57) ABSTRACT

Systems and methods are disclosed for a shuttle track system having a calibration shuttle for determining portions of the track having non-conforming geometry for optimum use of the shuttle track system. For example, the shuttle track system may include a track having an electromagnetic propulsion system (e.g., linear synchronous motor) embedded between two sides of the track. The calibration shuttle may move to various locations on the track and may use imaging systems for generating image data of a portion of the track. A trained model may process the image data to determine edges and surfaces of the components of the track and may determine distances between reference points on the track. The distances may be compared to threshold values to determine if they are in conformity with desired track geometry.

20 Claims, 10 Drawing Sheets

SYSTEMS AND METHODS FOR CALIBRATING A SHUTTLE TRACK

BACKGROUND

As users increasingly make online purchases, fulfillment of such purchases become increasingly complicated. For example, a fulfillment center may have output of upwards of one million packages per day. With such demands, efficiency of logistics related to processing orders and distributing packages is of high importance. To achieve efficient distribution and sortation and ultimately fulfillment of such orders, often various conveyor, roller, chute, and/or shuttle systems are used throughout a fulfillment center to distribute items and/or packages.

Recently, shuttles have been used move items and packages throughout such fulfillment centers. Shuttles may be powered by various means including electromagnetic propulsion. However, for consistency in power delivery, shuttles which may include magnetic portions must be positioned within a consistent distance from an magnetic portion of the track. Further to avoid collisions between the shuttle and the track, a sufficient distance is required between the track surface, electromagnetic portion of the track, and components of the shuttle. Accordingly, improvements in shuttle track systems including electromagnetic propulsion systems may be desired.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming. It is understood that a fulfillment center may alternatively be a sorting center and/or a shipping/delivery center.

To efficiently and safely sort products and/or items in such a facility, a shuttle track system is provided herein. The shuttle track system may include interconnected shuttle tracks including an electromagnetic propulsion system such as a linear synchronous motor (LSM) system. Shuttles may include magnetic portions that may interact with the with the linear synchronous motors, which may propel the shuttles along the track. To ensure consistent spacing between the magnetic portion of the shuttle and the linear synchronous motor, a calibration shuttle may be used.

The calibration shuttle may include a base portion which may have a low friction component for interfacing with the track along the side of the track. The calibration shuttle may further include a structure for supporting imaging systems for generating images including image data of the track. The image data may be processed to determine reference points at each side of the track and at the LSM. The distances between the reference points may be calculated to determine whether the LSM and track components are too close or too far from the shuttle.

Figure 1:
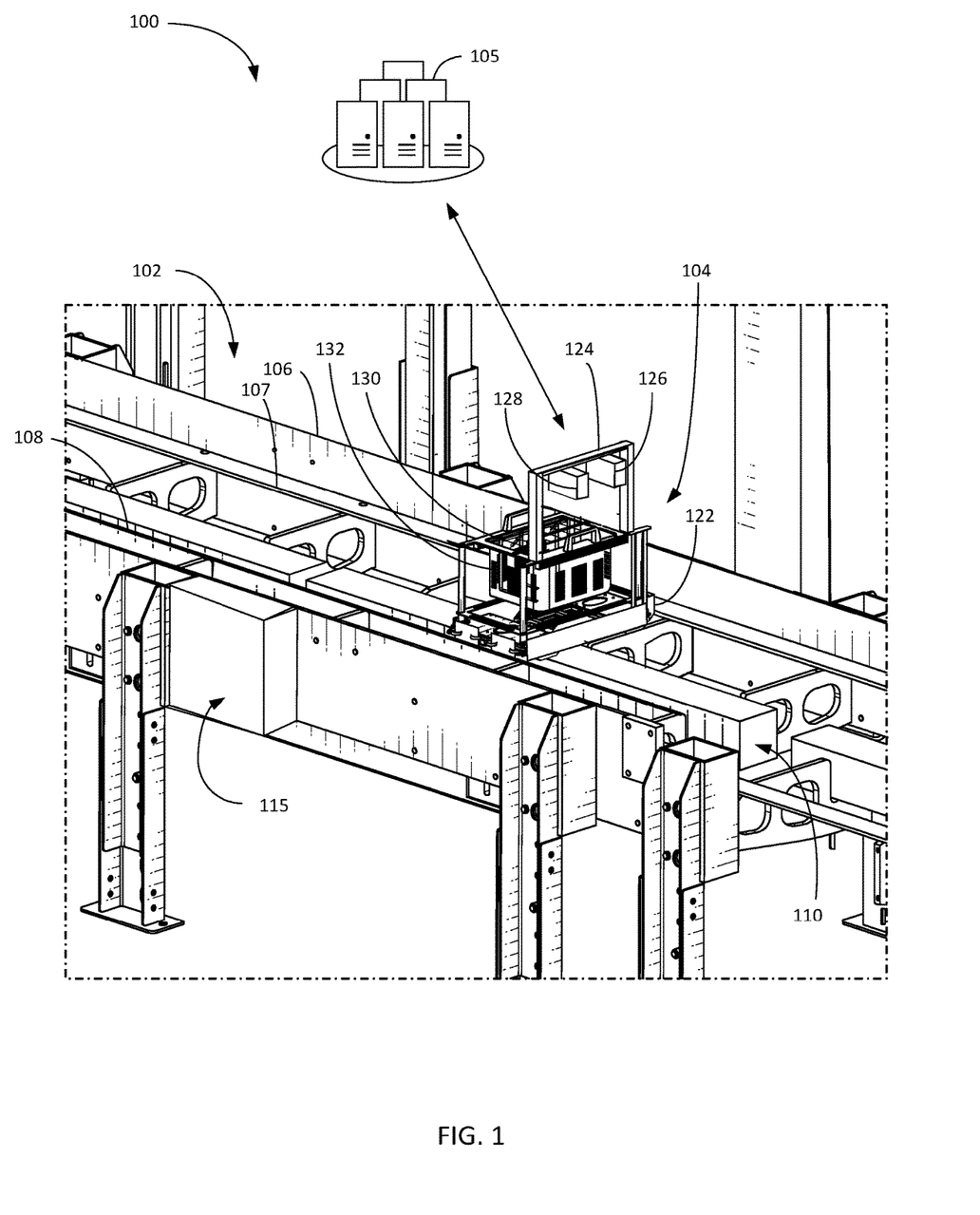
FIG. 1 is a schematic illustration of a shuttle track system with a track, electromagnetic propulsion, and a calibration shuttle on the track, in accordance with one or more embodiments of the disclosure.

Referring now to FIG. 1, a schematic illustration of a shuttle track system with a track having electromagnetic propulsion and a calibration shuttle on the track is depicted in accordance with one or more embodiments of the disclosure. As shown in FIG. 1, shuttle track system 100 may include track 102, calibration shuttle 104, and remote device 105. Shuttle track 102 may include sides 106 and 108 which may include one or more rails, walls, or other guiding structures and/or track rails (e.g., track rails 107) which may support a shuttle such as a shuttle that transports packages or other items and/or calibration 104.

Track 102 may include sides 106 and 108 and electromagnetic propulsion system 110 between sides 106 and 108. Electromagnetic propulsion system 110 may be any type of electromagnetic propulsion system using electricity and magnetism to cause a shuttle to move along the track. For example, electromagnetic propulsion system 110 may be linear synchronous motors (LSMs) that are positioned along track 102. For example, LSMs may be positioned along a center of a track and may propel calibration shuttle 104 along a track to desired coordinates on a track.

Track 102 may include controller 115 which may control one or more components of track 102. Controller 115 may be any suitable computing device having a processor, memory, and optionally a display. Controller 115 may communicate with server 105 to cause calibration shuttle 104 and any other shuttles to move to a certain location along the track.

Calibration shuttle 104 may include base 122, support structure 124, power source 132 (e.g., battery) and/or computing system 130. Base 122 may include a low friction surface (e.g., wheels, low friction flat surface, or the like) which may interface with and/or be guided by sides 106 and/or 108 for moving shuttle 104 down a track. Base 122 may be the same as or similar to a base used to transport packages, totes, and/or items on an item or tote shuttle. Support structure 124 may extend from base 122 and may be a structure that supports one or more imaging system (e.g., imaging system 126 and/or imaging system 128), power supply 134, and/or computing system 130.

As shown in FIG. 1, imaging systems may be any type of image sensor (e.g., camera) or other device capable of capturing image data. For example, the imaging systems may generate high-resolution image data (e.g., 1280×1024 pixels), may have 3D vision capabilities, and/or may have a high frame rate (e.g., 15 fps). Imaging system 126 and/or imaging system 128 may be oriented in the same direction such that imaging system 126 and/or imaging system 128 may capture image data of the track including sides 106 and 108 as well as electromagnetic propulsion 110. The imaging systems may generate image data corresponding to track geometry.

In one example, image data may have lighting such as one or more integrated laser line projectors to provide uniform lighting for measurement of the track. Imaging systems 128 and 126 may incorporate computing system 130 or may have their own computing system and/or devices. Computing system 130 may be any type of computing device having memory and one or more processors. Computing system 130 may be a controller for calibration shuttle 104 and perform operations and/or tasks of calibration shuttle 104. Power source 132 may supply power to imaging systems 126 and/or 128 and/or computing system 130.

Imaging systems 128 and 126 and/or computing system 130 may include, execute and/or run one or more models (e.g., algorithms) that may process and analyze the image data. For example, the models may be one or more machine learning models trained to detect sides 106 and 108 and electromagnetic propulsion system 110 and determine sample areas, reference points, distances relating thereto, and/or determine track geometry. Alternatively, or additionally, remote device 105 may include, execute, and/or run the one or more models.

In one example, calibration shuttle 104 may move along track 102 to certain coordinates, may generate image data corresponding to track geometry at those coordinates, and may determine if the geometry falls within predefined thresholds or limits. Information about the track geometry may be sent to remote device 105. Remote device 105 may be any computing device with memory and a processor. Calibration shuttle 104 and/or controller 115 may communicate with remote device 105 via any well-known wired or wireless system (e.g., Bluetooth, Bluetooth Low Energy (BLE), near field communication protocol, Wi-Fi, cellular network, etc.).

Figure 2:
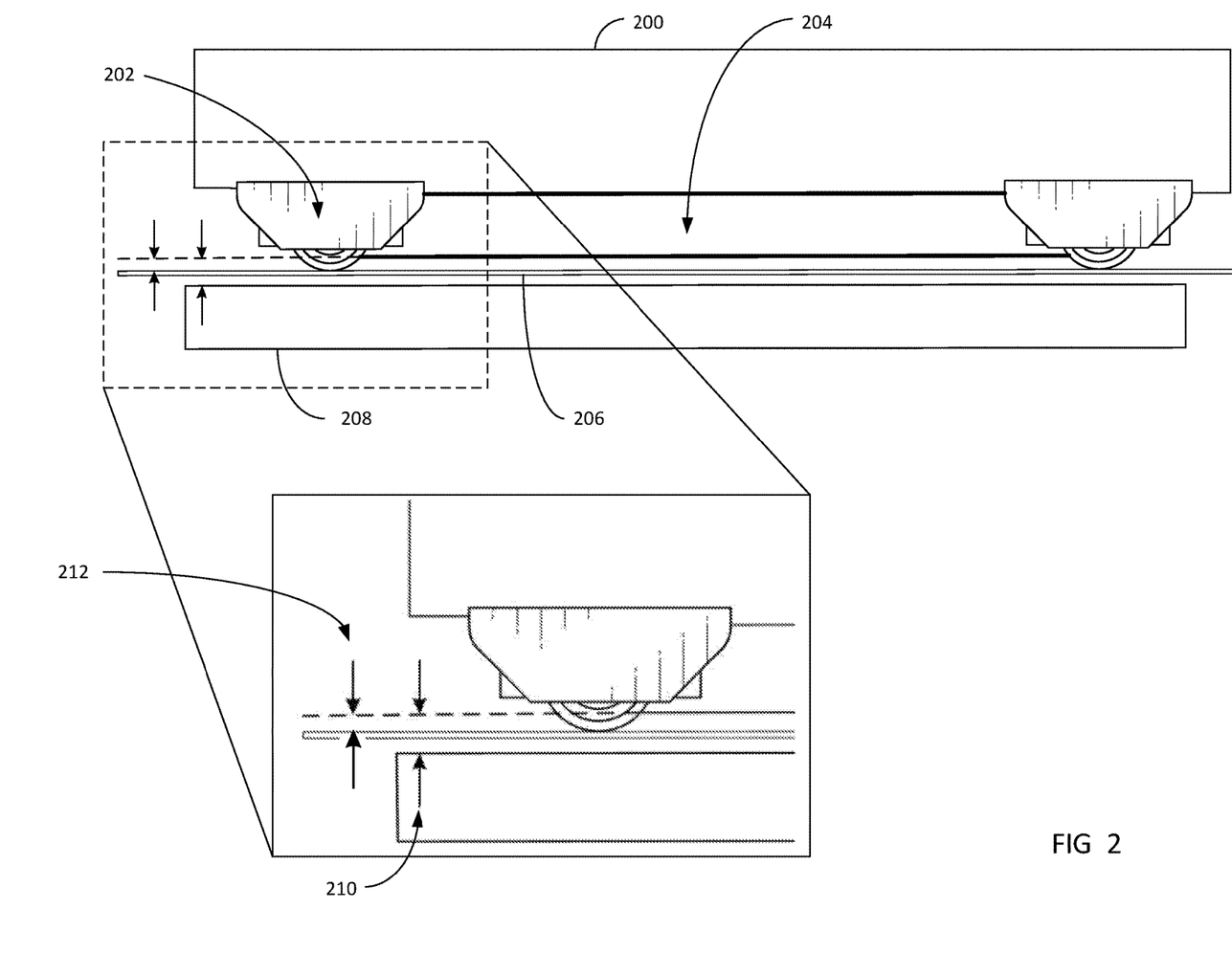
FIG. 2 is a schematic illustration of a base of a calibration shuttle on a track, in accordance with one or more embodiments of the disclosure.

Referring now to FIG. 2, a schematic illustration of a base of a calibration shuttle on a track is depicted, in accordance with one or more embodiments of the disclosure. Base 200 may be the same as base 122 of FIG. 1 and may include guides 202 which may be wheels or any other low friction structure. Base may include magnetic portion 204 which may be any magnetic and/or ferrous material. Guides 202 may contact sides of the track (e.g., 206) which may support base 200 on the track. Electromagnetic propulsion system 208 may be positioned between each side and may be a LSM.

As shown in FIG. 2, a bottom portion of magnetic portion 204 may be offset by distance 212 from electromagnetic propulsion system 208 and distance 212 from the track sides. It may be desirable for distance 210 and/or distance 212 to be close enough for a magnetic field generated by electromagnetic propulsion system 208 to interact with magnetic portion 204 without resulting in contact between the two components. Distance 212 may be set at an amount sufficient to prevent contact between magnetic portion 204 and electromagnetic propulsion system 208 while optimizing force transfer. Ranges for optimal and/or acceptable amounts for distance 212 and/or distance 210 may be predetermined.

Figure 3:
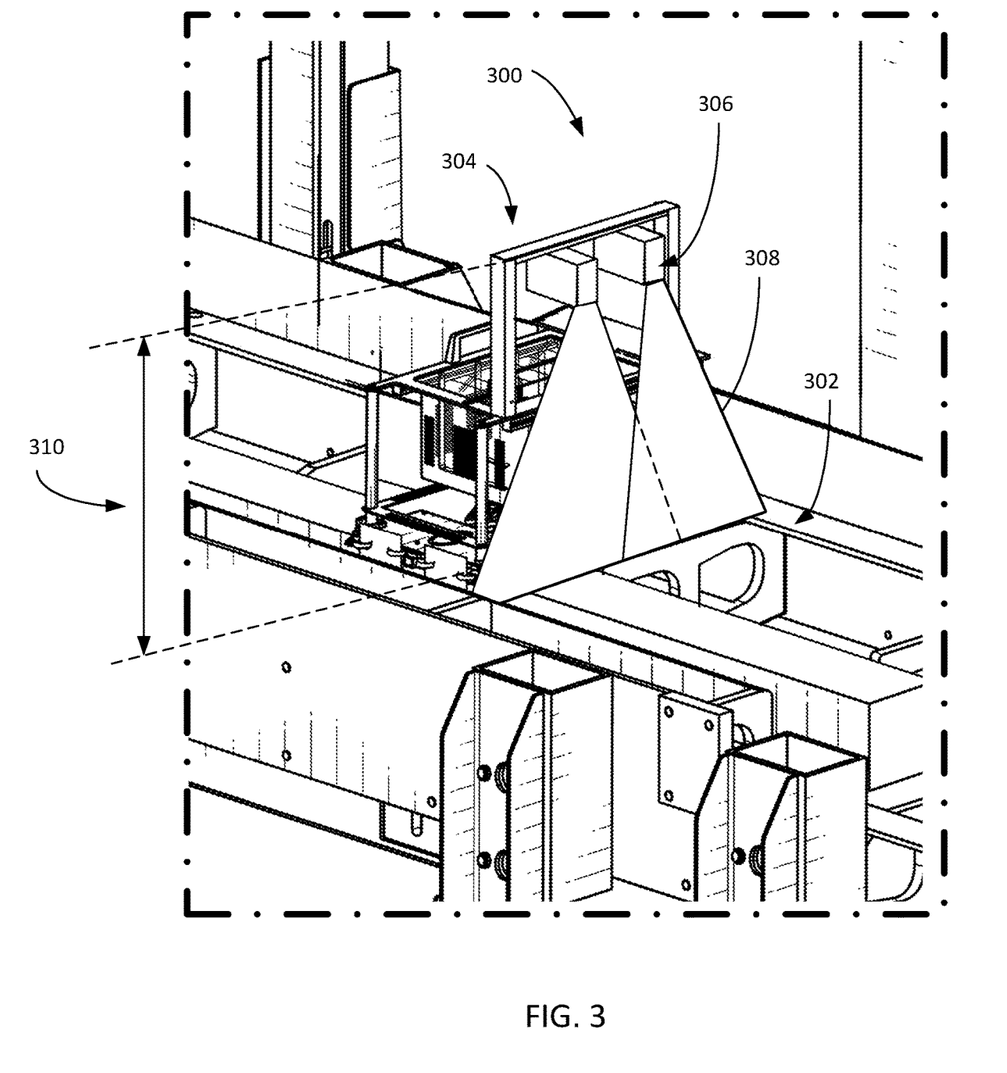
FIG. 3 is a schematic illustration a calibration shuttle on a track with imaging systems, in accordance with one or more embodiments of the disclosure.

Referring now to FIG. 3, is a schematic illustration a calibration shuttle on a track with imaging systems is depicted, in accordance with one or more embodiments of the disclosure. Shuttle track system 300 may be the same as or similar to shuttle track system 100 of FIG. 1 and may include track 302 and calibration shuttle 304 which may include imaging systems 306. While two imaging systems are illustrated, it is understood that a greater or fewer number of imaging systems may be used.

As shown in FIG. 3, imaging systems 306 may be oriented in the same direction (e.g., may be parallel) with respect to the base and may have overlapping field of view 308 to capture image data corresponding to sides of the track and the electromagnetic propulsion system. Imaging systems 306 may be positioned at height 310 which may be a distance from a bottom of the base of the calibration shuttle. Height 310 may be used to determine track geometry and otherwise calibrate image data generated by imaging systems 306.

Figure 4:
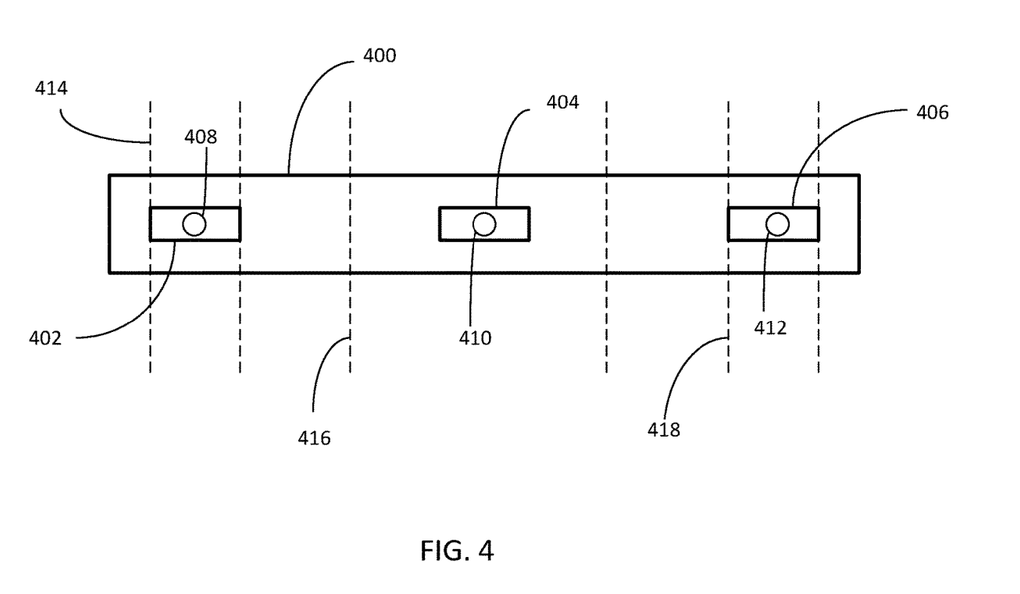
FIG. 4 is a schematic illustration of a representative image with three sample areas, in accordance with one or more example embodiments of the disclosure.

Referring now to FIG. 4, a schematic illustration of a representative image with three sample areas is depicted, in accordance with one or more example embodiments of the disclosure. Representative image 400 may correspond to the field of view of the imaging system and may be generated by using image data. Representative image 400 may represent the position and/or geometry of the track including the sides and electromagnetic propulsion system. For example, detected areas 402, 404, and 406 may be identify portions of the track corresponding to side 414, electromagnet propulsion system 416, and side 418. In one example, the image data may be processed by a model to determine representative points 408, 410, and/or 412 corresponding to the representative points (e.g., center point, edges, etc.) on the sides and/or electromagnetic propulsion system.

Figure 5:
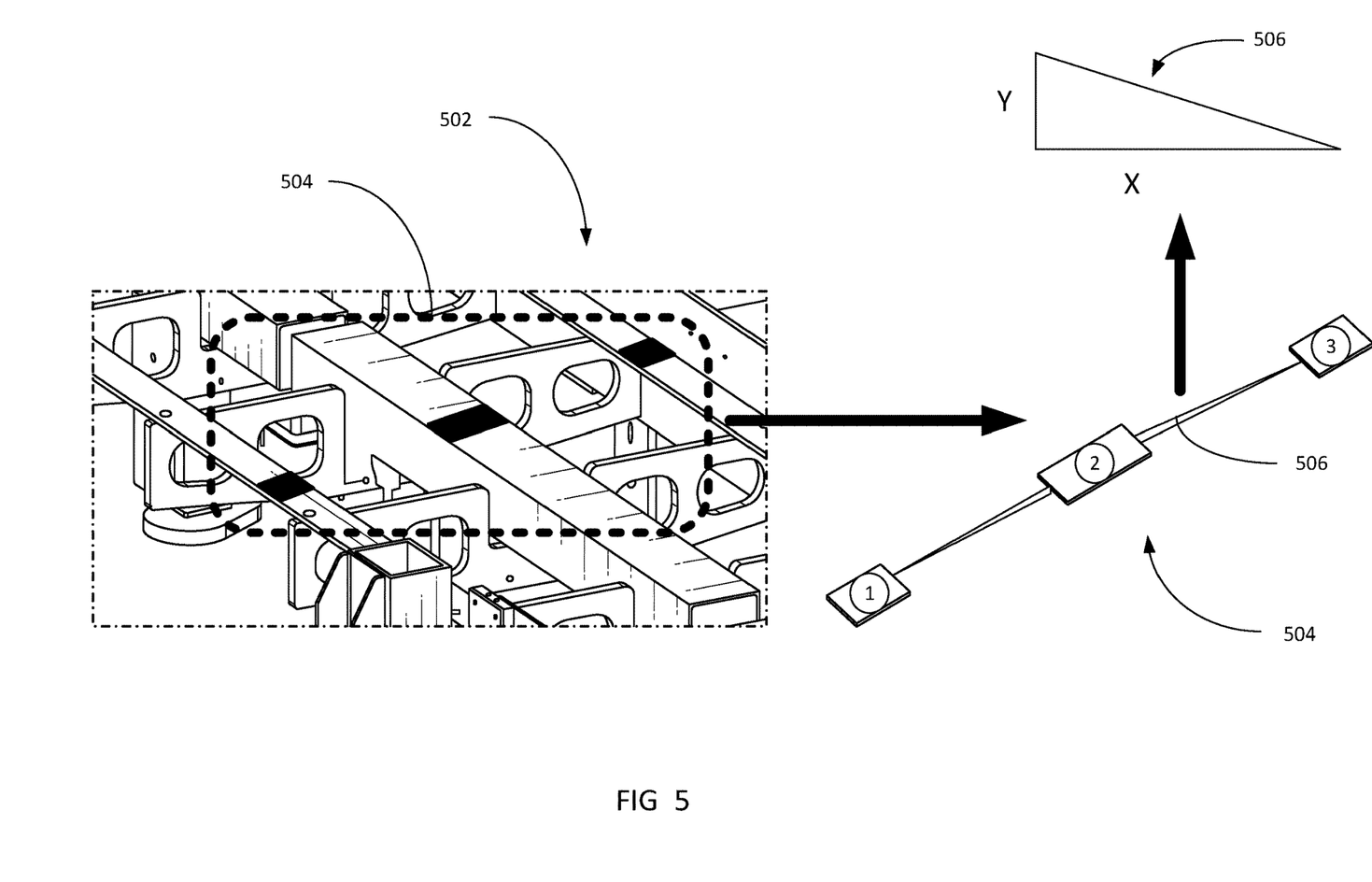
FIG. 5 is a schematic illustration of the calibration shuttle track with sample areas and distances between the sample areas, in accordance with one or more embodiments of the disclosure.

Referring now FIG. 5, a schematic illustration of the calibration shuttle track with sample areas and distances between the sample areas is illustrated, in accordance with one or more embodiments of the disclosure. For example, track 502 may be the same as or similar to track 102 of FIG. 1. Detected areas 504 may be detected by processing the image data generated by the imaging systems and may correspond to edges and/or surfaces of the sides, rails, and/or electromagnetic propulsion system.

As shown in FIG. 5, detected area 504 may include three distinct surfaces. The imaging systems, computing device of the shuttle, and/or a remote device may process the image data and detected areas and may determine distances between the detected areas and/or representative points (e.g. center points) in the detected areas. For example distance 506 may be the distance between the electromagnetic propulsion system and a right side of the track. Distance 506 may include a vertical distance (e.g., along the "Y" axis) and a horizontal distance (e.g., along the "X" axis).

Figure 6:
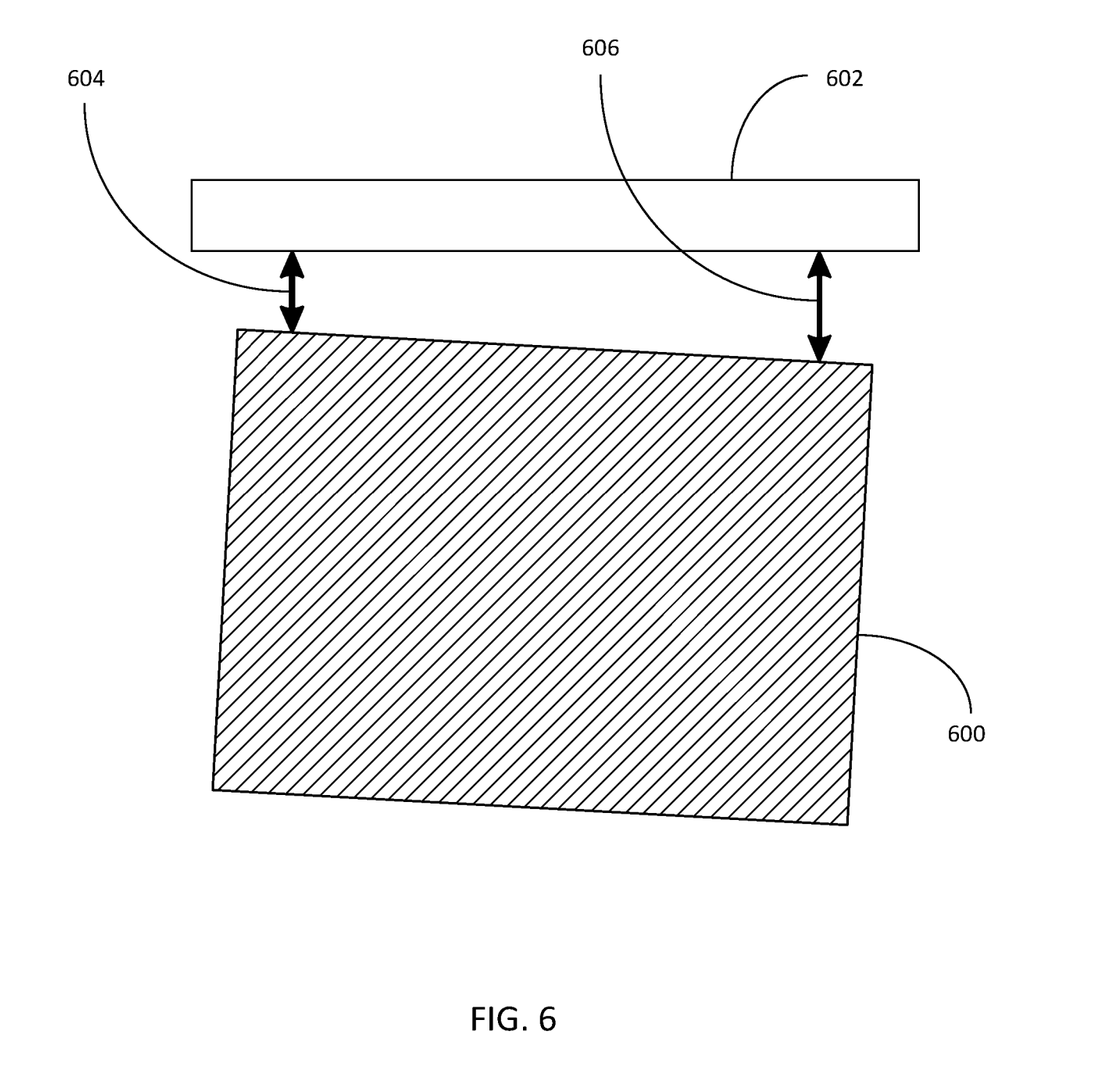
FIG. 6 is a cross-sectional view of a magnetic portion of the calibration shuttle and an electromagnetic propulsion system, in accordance with one or more embodiments of the disclosure.

Referring now FIG. 6, a cross-sectional view of a calibration shuttle and an electromagnetic propulsion system is illustrated, in accordance with one or more embodiments of the disclosure. As shown in FIG. 6, electromagnetic propulsion system 600 may be tilted with respect to magnetic portion 602 of a collaboration shuttle as it travels down a track. For example, distance 604 on a left side of magnetic portion 602 may be smaller than distance 606 on a right side of magnetic portion 602. For this reason, the imaging systems may make multiple distance measurements between magnetic portion 602 and electromagnetic propulsion system 600. In one example, multiple representative points may be determined for propulsion system 600.

Figure 7:
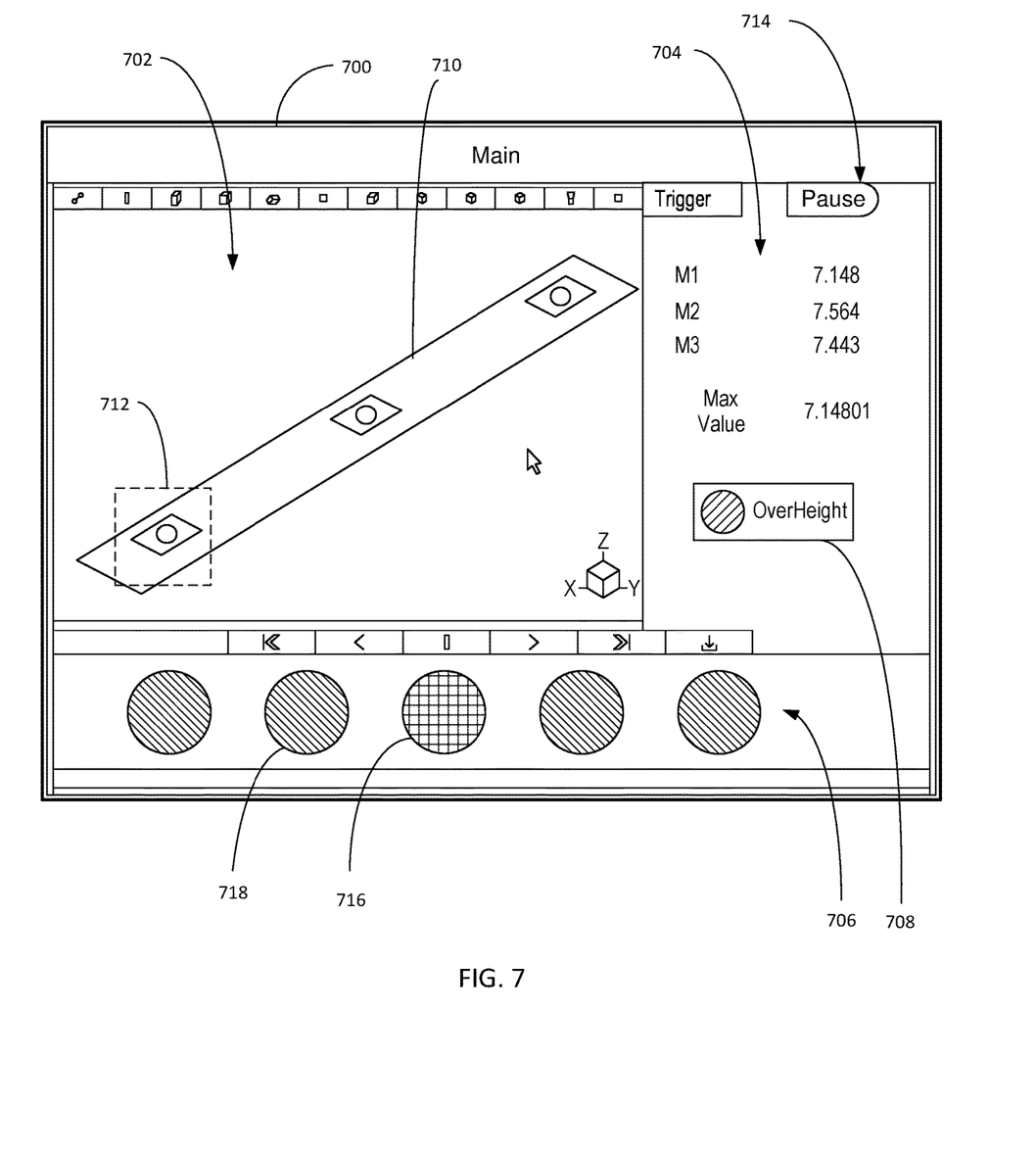
FIG. 7 is a schematic illustration of a graphic user interface including a visual representation of the reference points, in accordance with one or more embodiments of the disclosure.

Referring now FIG. 7, a schematic illustration of a graphic user interface including a visual representation of the reference points, in accordance with one or more embodiments of the disclosure. Graphic user interface 700 may be presented on a remote device or other computing device to visually represent the distance between the sides of the track and the electromagnetic propulsion system and/or the shuttle (e.g., magnetic portion) and the electromagnetic propulsion system.

Graphic user interface 700 may include main window 702 which may show a representation of the detected regions of the track (e.g., sides and LSM) in field of view 710. Main window 702 may also visually indicate areas of concern (e.g., using bounding box 712). Graphic user interface 700 may also include side window 704 which may include distance measurement data as well as visual indicator 708 which may indicate whether the distance between the shuttle and the electromagnetic propulsion system is acceptable. For example, a green circle may indicate the distance is acceptable and a red circle may indicate the distance falls below a threshold value. The distances may be displayed as well.

Graphic user interface 700 may further include bottom window 706 which may include visual indicators corresponding to various distances between detected surfaces on the track. For example, each distance may be represented by a green circle to indicate the distance is acceptable and/or a red circle may indicate the distance falls below a threshold value. A user may engage button 714 to pause the analysis if, for example, it is desirable to manually adjust the track.

Figure 8:
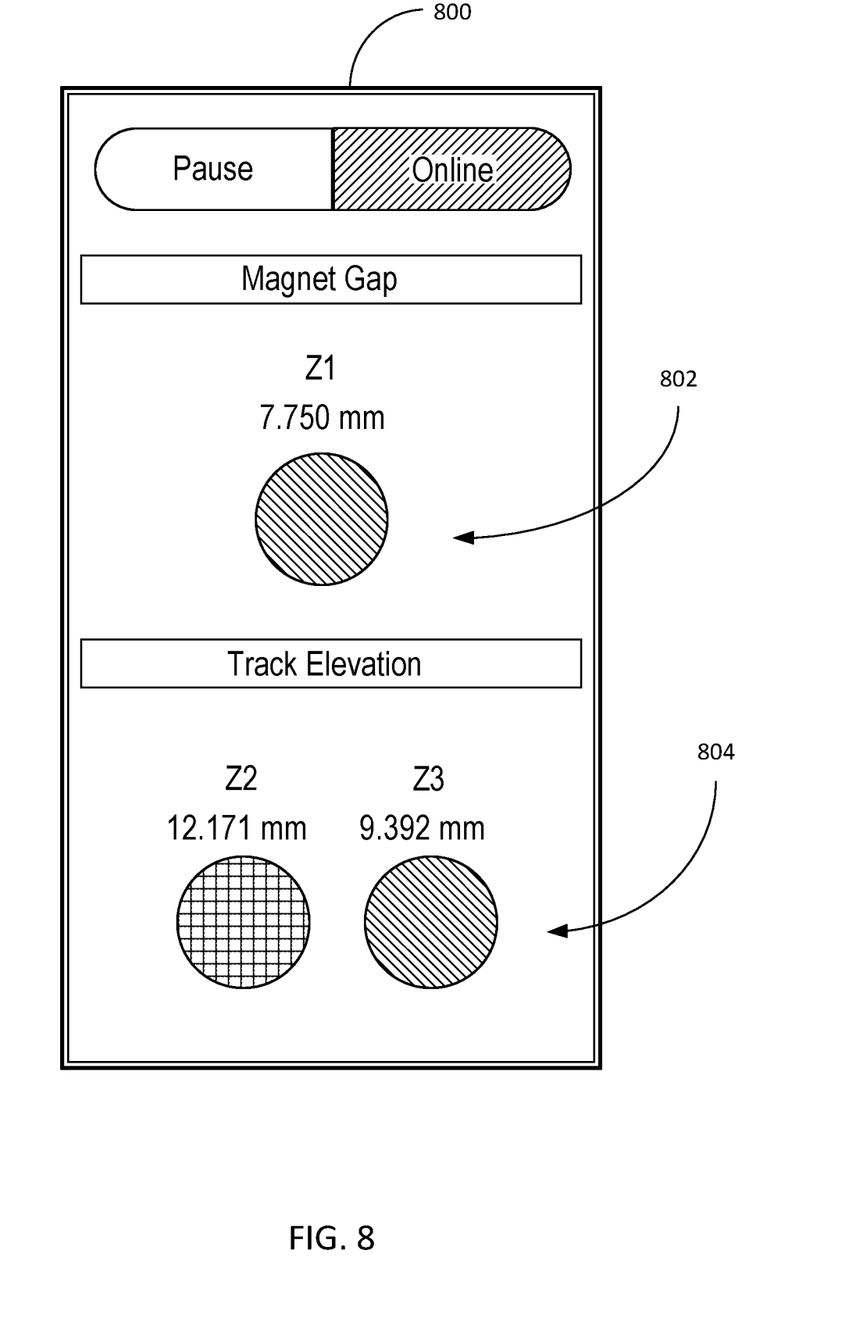
FIG. 8 is a schematic illustration of a graphic user interface including a visual indication of the distance between reference points, in accordance with one or more embodiments of the disclosure.

Referring now FIG. 8, a schematic illustration of a graphic user interface including a visual indication of the distance between reference points is depicted, in accordance with one or more embodiments of the disclosure. Graphic user interface 800 may include visual indicator 802 for the magnet gap (e.g., distance between the magnetic portion and the LSM) and visual indicators 804 for the track elevation and/or may include distance measurements corresponding to the visual indicators. The visual indicators in graphic user interface 800 may be the same as or similar to the visual indicators in graphic user interface 700. Graphic user interface 800 may also include engagement buttons to turn on and/or pause the calibration system.

Figure 9:
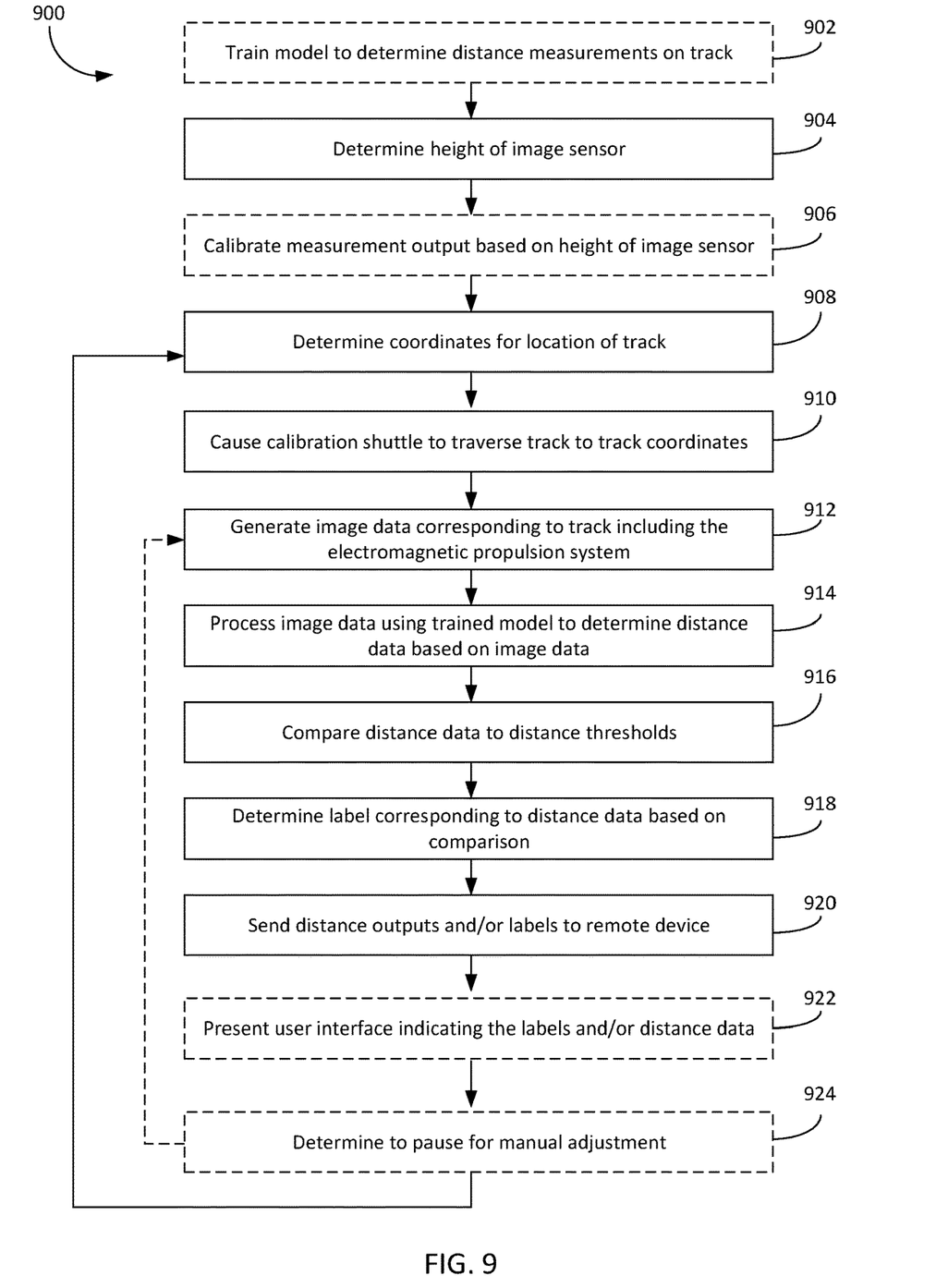
FIG. 9 is an exemplary process flow for determining distances between reference points of a track, in accordance with one or more embodiments of the disclosure.

Referring now to FIG. 9, example process flow 900 for determining track geometry and detected portions of the track that need to adjusted for operation of the shuttle track system is depicted. It is understood that one or more blocks of process flow 900 may be optional and/or may be performed in a different order. To initiate process flow 900, at optional block 902 a machine learning model may be trained to detect features and/or surfaces of the track and/or determine distances between representative points on the track (e.g., between an edge or surface of an electromagnetic propulsion system and a track surface and/or rail). At optional block 904, a height of an image sensor of a imaging sensor (e.g., camera lens) may be determined. At optional block 906, the measurement output and the trained model may be calibrated based on the height of the image sensor.

At block 908, computer-executable instructions stored on a memory of a device, such as an imaging system and/or a remote computing device, may be executed to determine coordinates for a location on a track. At block 910, computer-executable instructions stored on a memory of a device, such as an imaging system and/or a remote computing device, may be executed to cause the calibration shuttle move along the track to the coordinates.

At block 912, computer-executable instructions stored on a memory of a device, such as an imaging system and/or a remote computing device, may be executed to generate image data corresponding to the track including the electromagnetic propulsion system. At block 914, computer-executable instructions stored on a memory of a device, such as an imaging system and/or a remote computing device, may be executed to process the image data using the trained model to determine distance data for portions of the track based on the image data. The distances may be determined based on reference points determined by the trained model, for example.

At block 916, computer-executable instructions stored on a memory of a device, such as an imaging system and/or a remote computing device, may be executed to compare the distance data to distance thresholds to determine if the distances between components of the track exceed (e.g., is more than or less than) the threshold values or ranges. At block 918, computer-executable instructions stored on a memory of a device, such as an imaging system and/or a remote computing device, may be executed to determine a label corresponding to the distance data based on the comparison. For example, if the threshold is exceeded, the distance may be labeled as non-conforming.

At block 920, computer-executable instructions stored on a memory of a device, such as an imaging system and/or a remote computing device, may be executed to send distance data and/or labels to a remote device. The calibration shuttle may periodically send this data, for example. At optional block 922, computer-executable instructions stored on a memory of a device, such as an imaging system and/or a remote computing device, may be executed to present a graphic user interface and/or cause a graphic user interface to be presented indicating the labels and/or distance data. The graphic user interface may optionally present an alert indicating the label.

At optional block 924, computer-executable instructions stored on a memory of a device, such as an imaging system and/or a remote computing device, may be executed to determine to pause the analysis for manual adjustment of the track (e.g., of the rails, track surface, and/or electromagnetic propulsion system). After block 924, either block 912 or block 908 may be reinitiated. For example, the calibration may navigate the track and provide this information to a remote computing device for further action. It is understood that analysis may occur in real-time or after data for a certain amount of track has been generated.

Illustrative Computer Architecture

Figure 10:
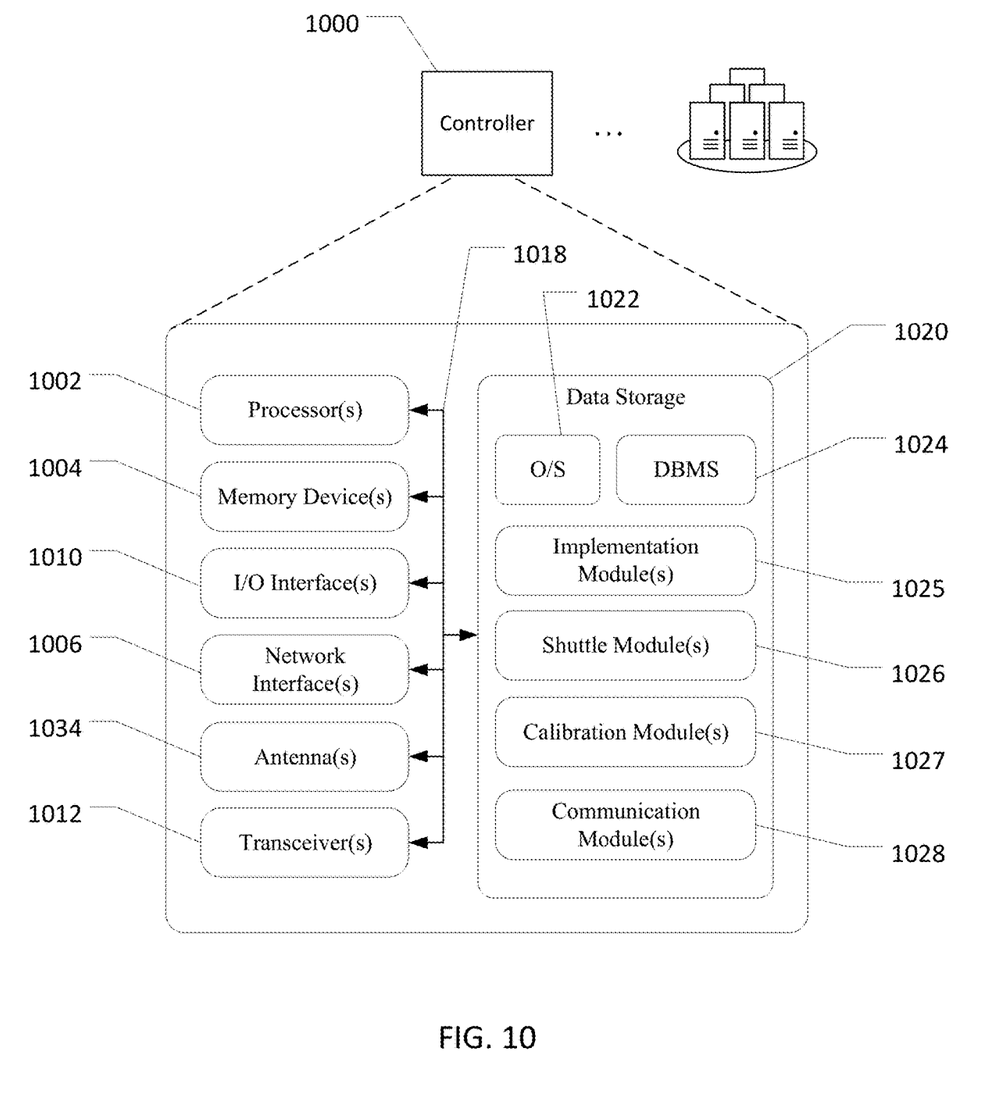
FIG. 10 schematically illustrates an example architecture of a calibration shuttle, in accordance with one or more embodiments of the disclosure.

FIG. 10 is a schematic block diagram of shuttle controller of the track calibration system for determining portions of the track that are non-conforming with optimal or minimum track parameters. Shuttle controller 1000 may be the same as or similar to computing system 132, for example. Shuttle controller 1000 may optionally be coupled to and/or communicate with devices including, but not limited to, imaging systems, computing devices, controllers, remote computing devices and/or one or more servers, or the like. It is understood that shuttle controller 1000 may instead be an imaging system, computing device, controller and/or remote device or the operations described herein may be performed by both shuttle controller 1000, and an imaging system and/or remote device.

Shuttle controller 1000 may be configured to communicate via one or more networks with one or more servers, computing devices, conveyors, controllers, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the shuttle controller 1000 may include one or more processors (processor(s)) 1002, one or more memory devices 1004 (generically referred to herein as memory 1004), one or more input/output (I/O) interface(s) 1006, one or more network interface(s) 1008, one or more optional sensors or sensor interface(s), one or more transceivers 1012, one or more optional speakers, one or more optional microphones, and one or more antenna(s) 1034. The shuttle controller 1000 may further include one or more buses 1018 that functionally couple various components of the shuttle controller 1000. The shuttle controller 1000 may further include one or more antenna (e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the shuttle controller 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more implementation module(s) 1025, one or more shuttle module(s) 1026, one or more calibration module(s) 1027, and/or one or more communication module(s) 1028. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the shuttle controller 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, user contact data, device pairing information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the shuttle controller 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1025 may include computer-executable instructions, code, or the like that responsive to execution by one or more of the processor(s) 1002 may perform functions including, but not limited to, overseeing coordination and interaction between one or more modules and computer executable instructions in data storage 1020, determining actions and tasks from a remote computing device or controller, determining actions associated with user interactions, determining actions associated with user input, sending and receiving signals and/or data to and from one or more sensors, switches, electromagnets, LSMs, controllers, other computing devices, servers, datastores and the like, initiating commands locally or at remote computing devices and/or controllers, and the like.

Shuttle module 1026 may include computer-executable instructions, code, or the like that responsive to execution by one or more of the processor(s) 1002 may perform functions including, but not limited to determining coordinates or a destination for a shuttle and/or a payload and determining a shuttle location with respect to a shuttle sortation system.

Calibration module 1027 may include computer-executable instructions, code, or the like that responsive to execution by one or more of the processor(s) 1002 may perform functions including, but not limited to controlling one or more imaging systems to generate images and/or process images using a model to determine distances between at certain portions of the track.

The communication module(s) 1028 may include computer-executable instructions, code, or the like that responsive to execution by one or more of the processor(s) 1002 may perform functions including, but not limited to, communicating with one or more sensors, controllers, conveyor belts, conveyor systems, for example, via wired or wireless communication, communicating with electronic devices, communicating with one or more computing devices, servers (e.g., remote servers), communicating with remote datastores and/or databases, sending or receiving notifications or commands/directives, communicating with cache memory data, and the like.

Referring now to other illustrative components depicted as being stored in the data storage 1020, the O/S 1022 may be loaded from the data storage 1020 into the memory 1004 and may provide an interface between other application software executing on the shuttle controller 1000 and hardware resources of the shuttle controller 1000. More specifically, the O/S 1022 may include a set of computer-executable instructions for managing hardware resources of the computing device 1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the shuttle controller 1000 is a mobile electronic device, the DBMS 1024 may be any suitable light-weight DBMS optimized for performance on a mobile device.

Referring now to other illustrative components of the shuttle controller 1000, the optional input/output (I/O) interface(s) 1006 may facilitate the receipt of input information by the shuttle controller 1000 from one or more I/O devices as well as the output of information from the shuttle controller 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the shuttle controller 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), Fire Wire, Thunderbolt, Ethernet port or other connection protocol that may connect to one or more networks. The I/O interface(s) 1006 may also include a connection to one or more of the antenna (e) 1034 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The shuttle controller 1000 may further include one or more network interface(s) 1008 via which the shuttle controller 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna (c) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna (c) 1034 may be communicatively coupled to one or more transceivers 1012 or radio components to which or from which signals may be transmitted or received.

As previously described, the antenna (e) 1034 may include a Bluetooth antenna configured to transmit or receive signals in accordance with established standards and protocols, such as Bluetooth and/or BLE. Alternatively, or in addition to, antenna (c) 1034 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna (c) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g. 802.11n), 5 GHZ channels (e.g., 802.11n, 802.11ac), or 60 GHz channels (e.g., 802.11ad). In alternative example embodiments, the antenna (e) 1034 may be configured to transmit or receive radio frequency signals within any suitable frequency range forming part of the unlicensed portion of the radio spectrum (e.g., 900 MHZ).

The antenna (c) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna (e) 1034—transmitting or receiving radio frequency (RF) signals in the bandwidth and/or channels corresponding to the communications protocols utilized by the shuttle controller 1000 to communicate with other devices. The transceiver(s) 1012 may include hardware, software, and/or firmware for modulating, transmitting, or receiving—potentially in cooperation with any of antenna (e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the shuttle controller 1000. The transceiver(s) 1012 may further include a low noise amplifier (LNA), additional signal amplifiers, an analog-to-digital (A/D) converter, one or more buffers, a digital baseband, or the like.

The optional sensor(s)/sensor interface(s) 1010 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) 1010 may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the shuttle controller 1000 and/or hosted on other computing device(s) accessible via one or more networks, may be provided to support functionality provided by the program module(s), applications, or computer-executable code depicted in FIG.

10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the shuttle controller 1000 may include alternate and/or additional hardware, software, or firmware components beyond those described or depicted without departing from the scope of the disclosure. More particularly, it should be appreciated that software, firmware, or hardware components depicted as forming part of the shuttle controller 1000 are merely illustrative and that some components may not be present or additional components may be provided in various embodiments. While various illustrative program module(s) have been depicted and described as software module(s) stored in data storage 1020 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
    a base having a magnetic portion and configured to move along a track, the magnetic portion configured to interface with linear synchronous motors disposed in the track such that the linear synchronous motors propel the base along the track, the track having a first side and a second side with the linear synchronous motors positioned between the first side and the second side;
    a support structure rigidly coupled to the base;
    a first imaging system coupled to the support structure and having a first orientation with respect to the base, the first imaging system configured to generate first image data representative of a first portion of the track;
    a second imaging system coupled to the support structure and having a second orientation parallel to the first orientation, the second imaging system configured to generate second image data representative of the first portion of the track;
    a battery configured to power the first imaging system and the second imaging system;
    memory configured to store computer-executable instructions; and
    at least one computer processor configured to access the memory and execute computer-executable instructions to:
        determine a first reference point, a second reference point, and a third reference point based on the first image data and the second image data, the first reference point corresponding to a linear synchronous motor, the second reference point corresponding to the first side of the track, and the third reference point corresponding to the second side of the track;
        determine a first distance between the first reference point and the second reference point, determine a second distance between the second reference point and the third reference point, and determine a third distance between the magnetic portion and the first reference point; and
        determine that one or more of the first distance, the second distance, or the third distance exceeds a threshold value.

2. The system of claim 1, wherein the computer processor is further configured to access the memory and execute computer-executable instructions to:
    send a message to a remote device indicative of one or more of the first distance, the second distance, or the third distance exceeding the threshold value;
    causing the remote device to present a message on a display indicative of one or more of the first distance, the second distance, or the third distance exceeding the threshold value.

3. The system of claim 1, wherein the computer processor is further configured to access the memory and execute computer-executable instructions to:
    process the first image data and the second image data using a model trained to determine reference points on the track based on image data corresponding to the track.

4. The system of claim 1, wherein first imaging system and the second imaging system are each positioned a fourth distance from the base and determining the first reference point, the second reference point, and the third reference point is based on the fourth distance.

5. A method comprising:
    causing, by a controller, a shuttle having an imaging system to move to a first position on a track, the track having a first side and second side and a propulsion system positioned between the first side and the second side;
    causing the imaging system to generate image data of the first side, second side, and propulsion system at the first position;
    determining a first reference point and a second reference point based on the image data, the first reference point corresponding to the propulsion system and the second reference point corresponding to the first side of the track;
    determining a first distance between the first reference point and the second reference point;
    determining the first distance exceeds a threshold value; and
    generating an alert indicating that the first distance exceeds a threshold value at the first position of the shuttle on the track.

6. The method of claim 5, further comprising processing the image data with a model trained to determine reference points on the track based on a set of image data corresponding to the track.

7. The method of claim 6, further comprising:
    determining a second distance between the magnetic portion and the first reference point;
    determining the second distance exceeds a second threshold value; and
    generating a second alert that the second distance exceeds the second threshold value at the first position of the shuttle on the track.

8. The method of claim 5, wherein the imaging system is positioned a second distance from a base of the shuttle, the system further comprising determining the first reference point and the second reference point based on the second distance.

9. The method of claim 5, wherein the shuttle has a base with a magnetic portion and the propulsion system is a set of linear synchronous motors adapted to move the magnetic portion of the base along the track.

10. The method of claim 5, further comprising:
determining a third reference point corresponding to second side of the track;
determining a third distance between the first reference point and the third reference;
determining the third distance exceeds a second threshold value; and
generating an alert that the third distance exceeds the second threshold value at the first position of the shuttle on the track.

11. The method of claim 5, wherein the shuttle has a second imaging system configured to generate image data of the first side, second side, and propulsion system at the first position, the system further comprising:
determining the first reference point and the second reference point based on the second image data; and
sending the first reference point, the second reference point, and the first distance to a remote device.

12. The method of claim 5, further comprising:
causing a remote device to present a graphic user interface visually indicating that the first distance corresponding to the first reference point and the second reference point exceeds the threshold value.

13. A system comprising:
memory configured to store computer-executable instructions; and
at least one computer processor configured to access memory and execute the computer-executable instructions to:
cause an imaging system of a shuttle positioned at a first position on a track to generate data of a first side, a second side, and propulsion system of the track at the first position;
determine a first reference point and a second reference point based on the image data, the first reference point corresponding to the propulsion system and the second reference point corresponding to the first side of the track;
determine a first distance between the first reference point and the second reference point;
determine the first distance exceeds a threshold value; and
generate an alert indicating that the first distance exceeds a threshold value at the first position of the shuttle on the track.

14. The system of claim 13, wherein the computer processor is further configured to access the memory and execute computer-executable instructions to process the image data with a model trained to determine reference points on the track based on a set of image data corresponding to the track.

15. The system of claim 13, wherein the imaging system is positioned a second distance from a base of the shuttle and wherein the computer processor is further configured to access the memory and execute computer-executable instructions to determine the first reference point and the second reference point based on the second distance.

16. The system of claim 13, wherein the shuttle has a base with a magnetic portion and the propulsion system is a set of linear synchronous motors adapted to move the magnetic portion of the base along the track.

17. The system of claim 13, wherein the computer processor is further configured to access the memory and execute computer-executable instructions to:
determine a second distance between the magnetic portion and the first reference point;
determine the second distance exceeds a second threshold value; and
generate a second alert that the second distance exceeds the second threshold value at the first position of the shuttle on the track.

18. The system of claim 13, wherein the computer processor is further configured to access the memory and execute computer-executable instructions to:
determine a third reference point corresponding to second side of the track;
determine a third distance between the first reference point and the third reference;
determine the third distance exceeds a second threshold value; and
generate an alert that the third distance exceeds the second threshold value at the first position of the shuttle on the track.

19. The system of claim 13, wherein the shuttle has a second imaging system configured to generate image data of the first side, second side, and propulsion system at the first position and wherein the computer processor is further configured to access the memory and execute computer-executable instructions to:
determine the first reference point and the second reference point based on the second image data; and
send the first reference point, the second reference point, and the first distance to a remote device.

20. The system of claim 13, wherein the computer processor is further configured to access the memory and execute computer-executable instructions to cause a remote device to present a graphic user interface visually indicating that the first distance corresponding to the first reference point and the second reference point exceeds the threshold value.

* * * * *